United States Patent [19]

Durvasula

[11] 3,849,768

[45] Nov. 19, 1974

[54] SELECTION APPARATUS FOR MATRIX ARRAY

[75] Inventor: Srirama S. Durvasula, Westboro, Mass.

[73] Assignee: Honeywell Information Systems, Inc., Waltham, Mass.

[22] Filed: Dec. 18, 1972

[21] Appl. No.: 316,334

[52] U.S. Cl....340/174 TB, 340/174 M, 340/174 LA

[51] Int. Cl......................... G11c 7/00, G11c 11/02

[58] Field of Search... 340/174 LA, 174 M, 174 TB; 307/270

[56] References Cited

UNITED STATES PATENTS

| | | | |
|---|---|---|---|
| 3,500,359 | 3/1970 | Hsieh et al. | 340/174 TB |
| 3,573,764 | 4/1971 | Larsen | 340/174 LA |
| 3,603,938 | 9/1971 | Cooper | 340/174 TB |
| 3,660,829 | 5/1972 | Wells et al. | 340/174 TB |

*Primary Examiner*—Stanley M. Urynowicz, Jr.
*Attorney, Agent, or Firm*—John S. Solakian; Ronald T. Reiling

[57] ABSTRACT

A plurality of loads such as magnetic cores in the matrix array are selected by the use of selection circuits enabled in an interleaved manner. For example, in the read/write cycle used for a coincident current memory, each such coincident current is provided by such selection apparatus having a first pair of selection circuits to provide read current in a first direction through the load (one or more magnetic cores) for readout thereof and a second pair of selection circuits for providing write current through the same load during the write portion of the memory cycle. Both the first and second pair of selection circuits are also utilized to perform the opposite function. That is, the first pair of selection circuits is utilized to provide write current to another load whereas the second pair of selection circuits is utilized to provide a read current through such another load.

13 Claims, 5 Drawing Figures

SELECTION APPARATUS FOR MATRIX ARRAY

BACKGROUND OF THE INVENTION

The present invention relates to selection systems and more particularly to selection circuits utilized to provide first and second currents to each load in a matrix array.

The computer art requires that memories be oriented in a matrix array. Each load, for example, a magnetic core or groups of cores in the memory, must be selected by means of selection circuits. In a magnetic core memory, coincident currents are provided. Each coincident current requires first and second currents or more particularly, a read current and a write current. In order to provide a read current, a first pair of selection circuits or more simply stated, first and second transistors are enabled so that the read current may be passed through the core in a first direction, whereas a second pair of transistors are utilized to pass current through the core in the other direction so as to be able to write information into the core. This requires that each core or groups of core be selected for the read and write cycle by means of at least four transistors in order to keep the duty cycle of each transistor to only one-half of the complete read/write or memory cycle. If both the read and write currents are provided through just one pair of transistors, this causes a heat build-up in the transistors thereby leading to malfunctions. If the current capability of such transistors are increased, the physical size of such transistors increase and this causes undue volume in the memory package.

It is accordingly an object of the invention to provide an improved memory selection apparatus which reduces the number of components required to select a given load or groups of loads.

It is a further object of the invention to provide such an improved selection apparatus utilizing a simple construction with components which allows a small physical package.

SUMMARY OF THE INVENTION

The purposes and objects of the invention are satisfied by providing selection apparatus for a matrix having a plurality of loads. The selection apparatus includes at least a first pair and a second pair of selection means. The first pair is coupled to provide a first current to one of the loads whereas the second pair is coupled to provide a second current to such one of the loads. The selection means further includes means for coupling the first pair to provide a second current to another of the loads and further means for coupling the second pair to provide a first current to such another of said loads.

BRIEF DESCRIPTION OF THE DRAWINGS

The advantages of the foregoing configurations of the present invention become more apparent upon reading the accompanying detailed description in conjunction with the figures in which.

DETAILED DESCRIPTION OF THE PREFERRED EMBODIMENT

Figures 1, 2:
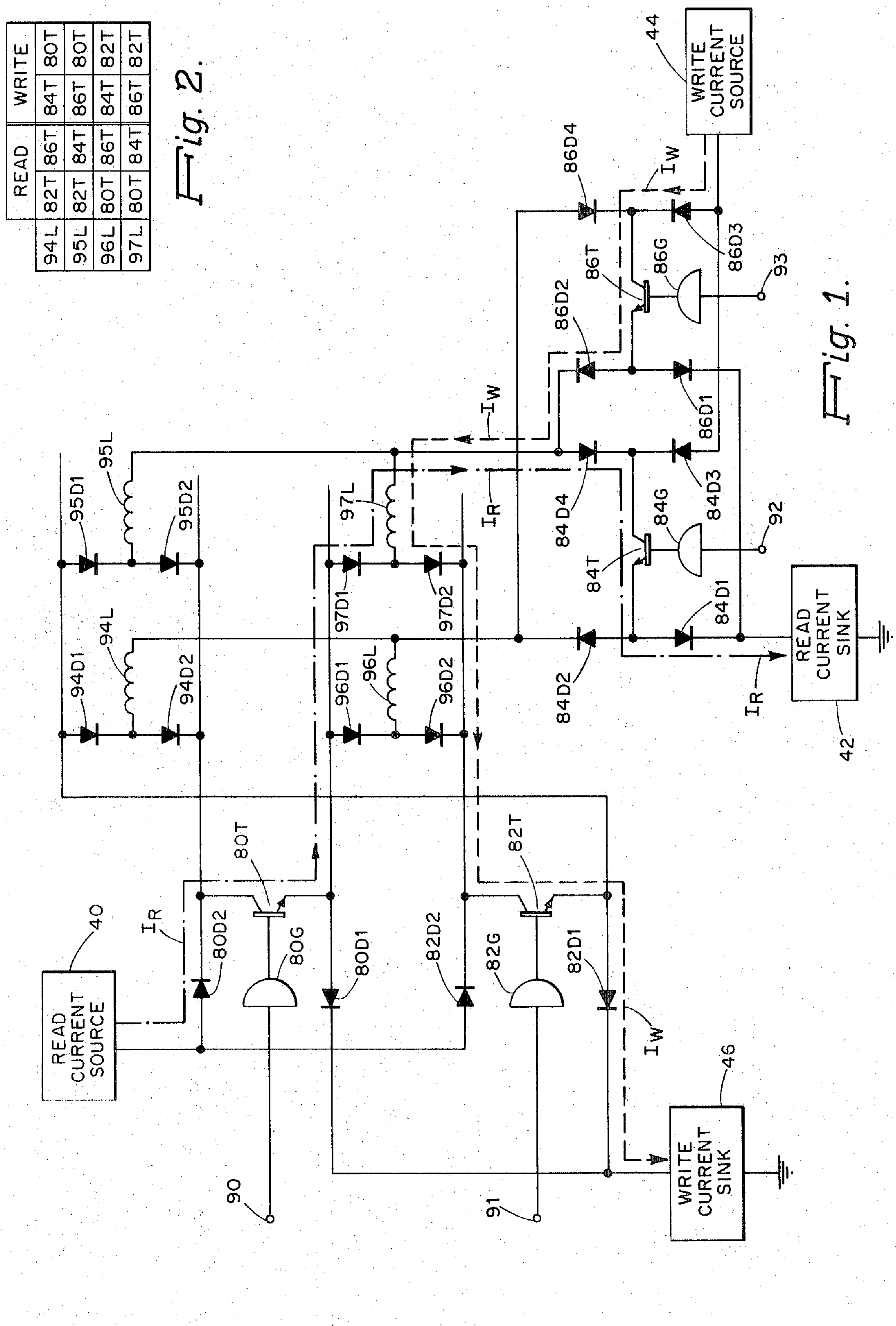
FIG. 1 illustrates a schematic diagram of the apparatus of the invention.
FIG. 2 illustrates a state diagram in explanation of the apparatus of FIG. 1.

With reference to FIG. 1, there are shown four loads 94L through 97L. Each of such loads are selectable via selection signals received at terminals 90 through 93. Each of the loads 94L through 97L represents one or more loads such as a plurality of magnetic cores, however, it should be understood that the apparatus of the present invention is not limited to the use of magnetic cores for the loads but is useful in any application wherein two currents must be provided to the load. In the example wherein the loads are magnetic cores, the apparatus shown in FIG. 1 is for use in providing one coincident current for reading or writing information from the core. The selection apparatus shown in FIG. 1 is duplicated for the other coincident current, and is not shown for purposes of clarity.

Coupled with each terminal 90 and 91 is a driver shown by the symbol for a gate and a transistor plus two isolation and steering diodes. Coupled with each terminal 92 and 93 is also a driver and a transistor plus four isolation and steering diodes. The actual type of drivers and transistors shall be particularly identified with reference to FIG. 4. Coupled with each load are also two isolation and steering diodes.

If the loads are considered to be magnetic cores, then during a read cycle the current must be provided in a first direction and during the write cycle the current must be provided in a second and opposing direction. Read current source 40 and write current source 44 coupled with respectively the read current sink 42 and the write current sink 46 are provided in conjunction with the selection apparatus for this purpose. The selection apparatus includes the drivers, transistors and the isolation and steering diodes shown. The selection signals at the terminals 90 through 93 are provided by addressing circuits which will be shown with reference to FIG. 4.

Basically, a selection signal is received at either terminal 90 or 91 and another selection signal is received at terminal 92 or 93. In response to such selection signals, their respective transistors are enabled such that current will pass in one direction or another to enable the reading or writing of information from the load. The pair of transistors enabled during the reading of information from the load or magnetic core(s) is different from the pair of transistors utilized to write information into the load. Thus, during a read cycle, selection signals may be received at terminals 90 and 92 whereas during the second half of the memory cycle or the write cycle, selection signals would be received at terminals 91 and 93.

The current path for the respective read and write cycles are shown when load 97L is to be read or written into respectively. During the read cycle, for load 97L, terminal 90 receives a selection signal which via driver 80G turns on transistor 80T and that terminal 92 receives a selection signal to turn on transistor 84T via driver 84G such that read current flows from source 40 through diode 80D2, transistor 80T and further through diode 97D1, through load 97L and then through diode 84D4, transistor 84T and diode 84D1 to earch ground via read current sink 46. During the write cycle, for load 97L, selection signals are received at terminals 93 and 91 thereby turning on transistors 86T via driver 86C and turning on transistor 82T via driver 82G respectively. This enables write current to be provided via source 44 through diode 86D3, transistor 86T, diode 86D2, through the load 97L and then through diode 97D2, transistor 82T and diode 82D1 to earth ground via write current sink 42.

Thus, it can be seen that the transistors 80T and 84T are enabled when information is read from load 97L and that a different pair of transistors, namely transistors 86T and 82T are enabled when writing information into the load 97L. By providing such an interleaved arrangement of selection transistors, it can be seen that the number of transistors required to drive the load is reduced by one-half and further that the heat dissipation in each of the transistors is reduced, and this is provided without having to utilize larger and higher current rated components.

With reference to the state diagram of FIG. 2, the transistors enabled during the reading or writing of information with the loads 94L, 95L, 96L and 97L are indicated. As just discussed, during a read cycle of load 97L, transistors 80T and 84T are enabled and during the write cycle associated with load 97L, transistors 86T and 82T are enabled. During the reading associated with load 94L, transistors 82T and 86T are enabled via selection signals received at terminals 91 and 93. During the write cycle associated with load 94L, transistors 84T and 80T are enabled via selection signals received on terminals 92 and 90. A similar explanation follows for the read and write cycles associated with loads 95L and 96L.

Figure 3:
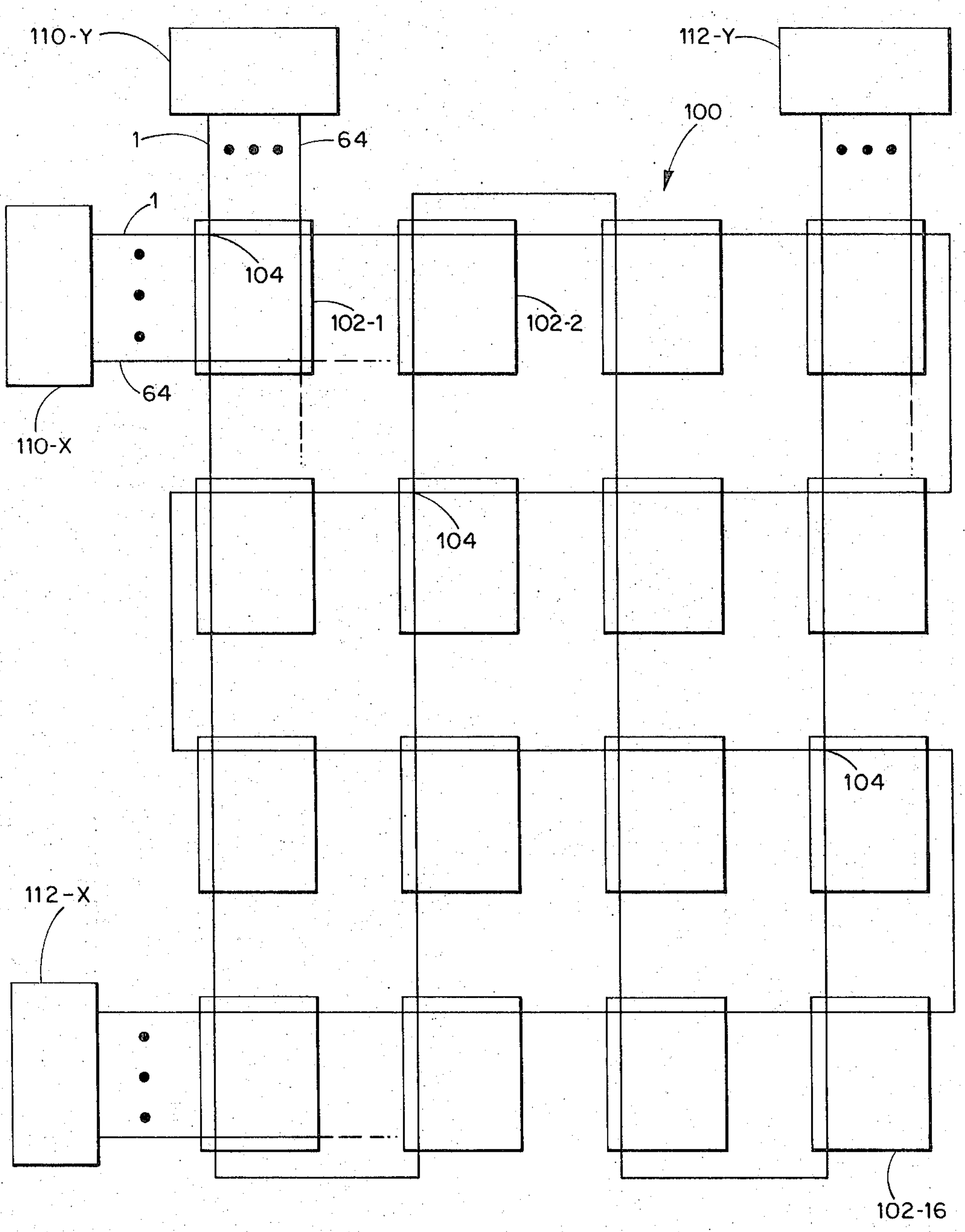
FIG. 3 illustrates a block diagram of a system in which the apparatus of the invention may be utilized.

FIG. 3 illustrates a block diagram of a system in which the apparatus of the present invention may be utilized. The block diagram illustrates a memory 100 which includes 16 bit mats 102-1 through 102-16. Each of the bit mats by way of example include a matrix arrangement of magnetic cores wherein the X axis has 64 rows and the Y axis has 64 columns such that each bit mat 102 includes 64 times 64 magnetic cores wherein a magnetic core is indicated by the intersection of an X and a Y selection wire at crossover points 104. Thus, in order to read or write information with one of the loads, coincident currents must be supplied along the X-axis and along the Y-axis of the memory 100 from current drivers 110-X and 110-Y to current drivers 112-X and 112-Y respectively. The cores are arranged such that each time X and Y coincident currents are generated, sixteen cores (one load) are read or written into.

Figure 4A:
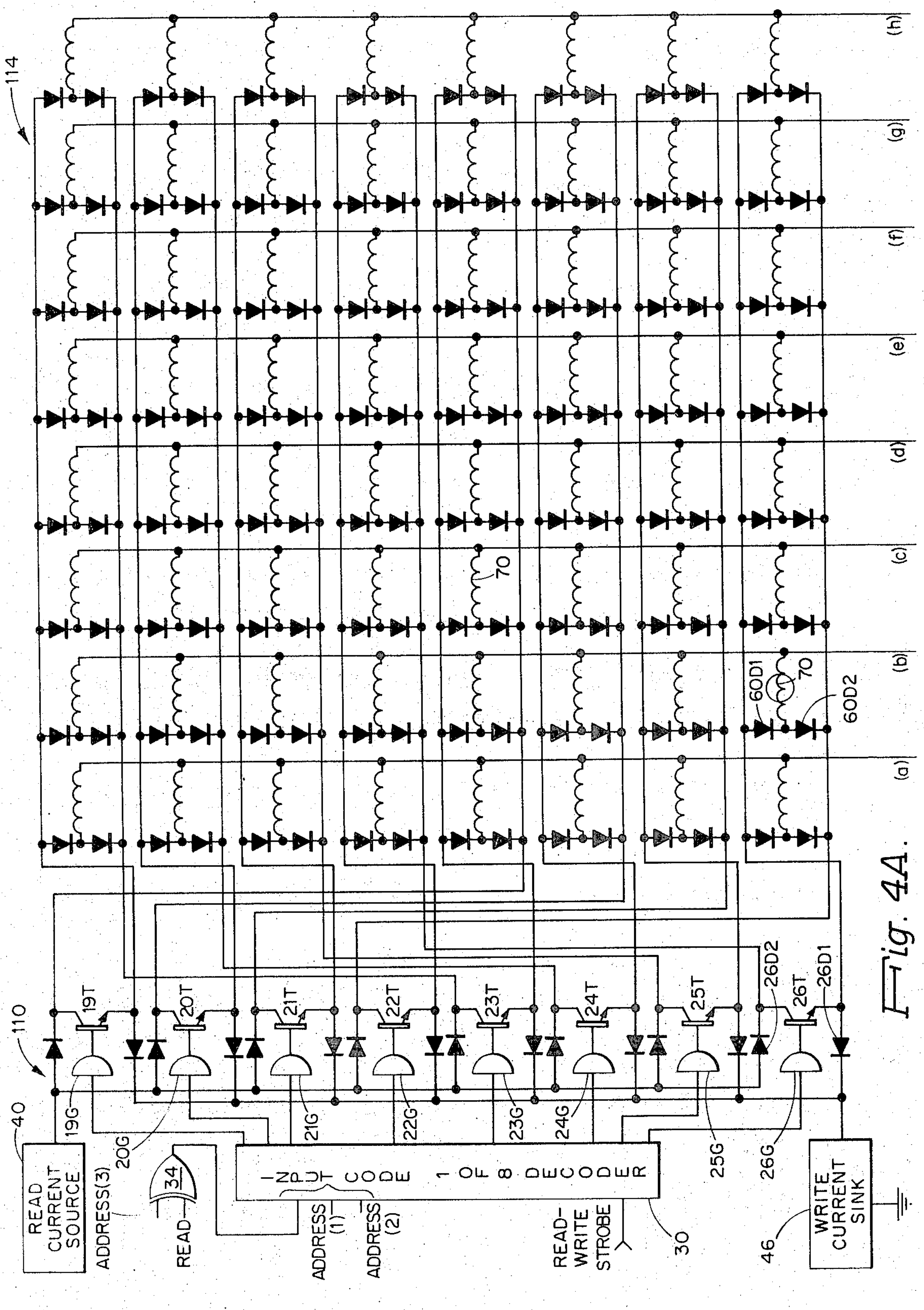
FIGS. 4A and 4B illustrate a detailed schematic diagram of a preferred embodiment of the apparatus of the present invention.
Figure 4B:
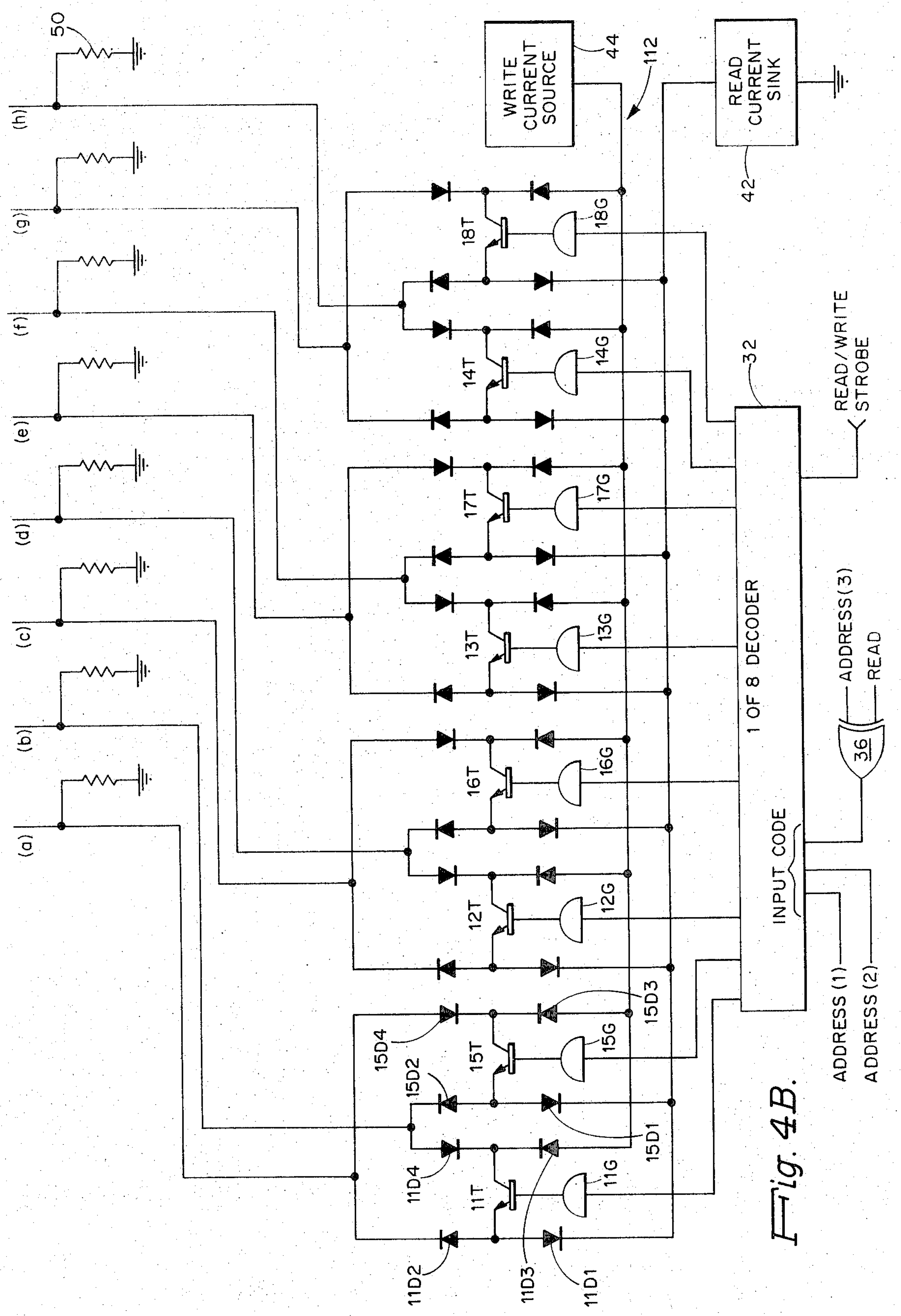

In order to select either of the 64 lines for delivery of coincident current thereto, the apparatus of the present invention as more particularly shown with reference to FIGS. 4A and 4B may be utilized. The selection apparatus shown in FIGS. 4A and 4B is utilized to select one coincident current only. Such selection apparatus is repeated for use in providing the other selection current. Thus, in order to provide up to 64 lines with current, a memory selection apparatus is required. Each of the 64 lines may be considered to be separate loads wherein each load includes 64 times 16 magnetic cores. For example, in FIG. 1, there are four loads, 94L to 97L shown, each of which loads may include a plurality of magnetic cores. This is of course by illustration only since the apparatus of the present invention may be utilized with a single magnetic core or any other device requiring two currents. A matrix of loads may then be considered such than an 8 × 8 matrix would give possible selection of 64 loads or lines.

Now with reference to FIGS. 4A and 4B, there is shown an 8 × 8 matrix 114 of 64 loads 70. Each load 70 as indicated hereinbefore, may include a plurality of magnetic cores as indicated with reference to FIG. 3. Further, each of the loads has associated therewith two isolation and steering diodes 60D1 and 60D2. In addition to the read and write current sources 40 and 42, and the read and write current sinks 42 and 46, there are also shown the current drivers 110 and 112 which are included in the selection apparatus of the invention. Driver 110 includes devices generally indicated as components 19 through 26 and driver 112 includes devices generally indicated as components 11 through 18. For an 8 × 8 matrix, sixteen drivers and transistors are required, eight for each axis. The rows are selected by means of selection circuits including driver 19G and transistor 19T through driver 26G and transistor 26T respectively. The selection circuits for the rows also each include two isolation and steering diodes as particularly described with reference to FIG. 1. The inputs to the drivers 19G through 26G are provided by means of decoder 30 which will be hereinafter described. Associated with each column are also eight selection circuits which include the four isolation and steering diodes as particularly described with reference to FIG. 1 and a driver 11G and a transistor 11T through driver 18G and transistor 18T respectively. Each of the inputs to drivers 11G through 18G are provided by a decoder 32 similar to decoder 30. The drivers and transistors are included in a memory driver circuit developed by Texas Instruments Inc. having part number SN 75328. Each device SN75328 includes four drivers or gates and four transistors. In order to reduce the dissipation in each of such memory driver circuits, the read and write currents in a given memory cycle are provided via different ones of such memory driver circuits. This further minimizes the power dissipation of such circuits by 50 percent. In order to accomplish this, the apparatus shown in FIGS. 4A and 4B are divided such that drivers 11G through 14G and transistors 11T through 14T are in one circuit, drivers 15G through 18G and transistors 15T through 18T are in a second memory driver circuit, gates 19G through 22G and transistors 19T through 22T are in a third memory driver circuit, and gates 23G through 26G and transistors 23G through 26G are in a four memory driver circuit.

Each of the column wires are coupled to the loads in a given column and at the other end to the circuits generally indicated by circuits 11 through 18. They also preferably include a termination resistor 50 coupled between such column wires and circuit ground in order to dampen out any ringing which may be included in the system.

The decoders 30 and 32 may be those one to eight line decoders manufactured by Texas Instruments Inc. and having a part number SN 74156. Each of the decoders generates a selection signal on one of its eight output lines depending upon the address bit pattern received on the three address input lines of the decoder. The 3 address bits coupled to the inputs of decoder 30 are different from those 3 address bits coupled to the inputs of decoder 32. The first and second address bits of each supplied address are coupled to the respective ones of decoders 30 and 32 directly. The third address bits are applied via an exclusive-OR circuit 34 to decoder 30 and an exclusive-OR circuit 36 to decoder 32 respectively. The two inputs to the exclusive-OR circuits are the third address bit and a read signal indicating the read cycle. The decoders 30 and 32 are enabled when a read/write strobe is generated. A read/write strobe is generated approximately during the middle of the read cycle and approximately during the middle of the write cycle. The exclusive-OR circuits are implemented such that during the read cycle a positive signal is received at one input of circuits 34 and 36. If the third address bit to either of circuits 34 or 36 is binary ONE, then the output to the respective decoders would be a binary ZERO. If the data address bit is a binary ZERO then the output to the respective decoders would be a binary ONE. Thus, in effect the third address bit is changed in binary state during the read cycle because of the exclusive-OR circuit. On the other hand, during the write cycle, the read input to exclusive-OR circuits 34 and 36 are binary ZEROs such that a binary zero received for the third address bit at the input of exclusive-OR gating circuits translates to provide a binary ZERO at the output thereof and at the input of the respective decoders. If the third address bit is a binary ONE, then during the write cycle the binary ONE is received at the input of the respective decoders also. By using the exclusive-OR circuits for the third address bit in combination with the read signal, or in the alternative the write signal, the need for a separate decoder is eliminated. However, the apparatus of the present invention does not preclude the use of a second decoder for both the column selection and second decoder for the row selection of the loads 70 in the matrix array.

For example, a first decoder may receive three address inputs and may be enabled by a signal indicating a read cycle. The second decoder would also receive three address bits some of which may be the same as the address bits received by the first decoder, and the second decoder would be enabled in response to a signal indicating the write cycle. However, this does mean that extra electronics is required and therefore except for a slight increase in speed of operation of the apparatus of the present invention, a second decoder does not probably give sufficient benefits for the expense and volume required for such design.

Thus, in explanation of the operation of the apparatus of FIGS. 4A and 4B with reference to the operation discussed with reference to FIGS. 1 and 2, if the address bits indicate that there is to be a memory cycle on load 70 which has a circle placed thereabound, and which is located on the bottom row, second from the left of FIG. 4A, then during the read cycle, driver 26G would be energized to turn on transistor 26T such that current is passed from source 40 through dides 26G to transistor 26T, diodes 60D1, the load and then through diode 11D4 and the now enabled transistor 11T (enabled via decoder 32 and driver 11G) and the current would then pass to the read current sink 42 via diode 11D1. During the write cycle for the same load 70, transistors 22T and 15T would be turned on in response to their respective decoders and drivers 22G and 15G respectively. This would allow the write current to pass from source 44 through diode 15D3, transistor 15T, diode 15D2, the load 70 and then through transistor 22T, diode 22D1 and finally to circuit ground via write sink 46.

Having described the invention, what is claimed as new and novel and for which it is desired to secure Letters Patent is:

1. Selection apparatus for a matrix having a plurality of loads, said apparatus comprising a plurality of selection means having a first pair of said selection means coupled to provide a first current to one of said loads and having a second pair of said selection means coupled to provide a second current to said one of said loads, said plurality of selection means further comprising means for coupling said first pair of said selection means to provide said second current to another one of said loads and means for coupling said second pair of said selection means to provide said first current to said another one of said loads, wherein each of said loads includes two ends and wherein each of said selection means includes a transistor such that a pair of said selection means includes two transistors, said transistors in said first pair coupled to different ends of at least two of said loads for providing a current path therethrough, and said transistors in said second path therethrough, and said transistors in said second pair coupled to different ends of at least two of said loads for providing a current path therethrough.

2. Apparatus as in claim 1 wherein each of said loads includes at least one magnetic core, wherein said first current is approximately one-half the current required to read information from the respective cores, and wherein said second current is approximately one-half the current required to write information into the respective cores.

3. Apparatus as in claim 1 wherein each of said loads includes at least one magnetic core, wherein said transistors in said first pair are coupled to provide a current path in a first direction through one of said cores and a current path in a second direction through another one of said cores, and wherein said transistors in said second pair are coupled to provide a current path in said first direction through said another one of said cores and a current path in said second direction through said one of said cores.

4. Apparatus as in claim 3 further comprising:

A. a read current source;

B. a write current source;

C. means for coupling said read current source with one of said transistors to provide a current path so that said read current flows through said last mentioned transistor before flowing through said load; and D. means for coupling said write current source with another of said transistors to provide a current path so that said write current flows through said last mentioned transistor before flowing through said load.

5. Apparatus as in claim 3, wherein the current in said current path in said first direction is approximately one-half the current required to read information from the respective core, and wherein the current in said current path in said second direction is approximately one-half the current required to write information into the respective core.

6. Selection apparatus for a matrix having a plurality of loads, said apparatus comprising:

A. a read current source for providing a read current;

B. a write current source for providing a write current;

C. a plurality of switch means comprising first, second, third and fourth switch means, each having a control terminal;
D. said plurality of loads comprising first, second, third and fourth loads;
E. means for receiving selection signals at each of said control terminals in a predetermined relationship;
F. first means, responsive to said selection signals, for providing a first current path from said read current source through said first switch means, through one of said loads and through said second switch means;
G. second means, responsive to said selection signals, for providing a second current path from said current source through said third switch means, through another of said loads, and through said fourth switch means;
H. third means, responsive to said selection signals, for providing a third current path from said write current source through said second switch means, through said another of said loads, and through said first switch means; and
I. fourth means, responsive to said selection signals, for providing a fourth current path from said write current source, through said fourth switch means, through said one of said loads, and through said third switch means.

7. Apparatus as in claim 6 further comprising means for providing the other half of current required to read data and to write data with said cores, said last mentioned means for providing including a plurality of switch means similar to said first through fourth switch means and a plurality of further means for providing similar to said first through fourth means for providing.

8. Apparatus as in claim 6 further comprising a plurality of integrated circuits each housing four of said switch means and wherein each of said first, second, third and fourth switch means are included in different ones of said integrated circuits.

9. Apparatus as in claim 6 wherein each of said loads includes a plurality of magnetic cores, wherein said read current is substantially one-half the current required to read data from the respective cores, and wherein said write current is substantially one-half the current required to write data into the respective cores.

10. Apparatus as in claim 9, wherein each of said switch means includes a transistor.

11. Apparatus as in claim 10 further comprising first and second diodes coupled with each of said transistors in said first and third switch means, said first diode conductive when said read current is generated and said second diode conductive when said write current is generated.

12. Apparatus as in claim 11 further comprising third, fourth, fifth and sixth diodes coupled with each of said transistors in said second and fourth switch means, said third and fourth diodes conductive when said read current is generated and said fifth and sixth diodes conductive when said write current is generated.

13. Selection apparatus for a matrix having a plurality of loads, said apparatus comprising:
A. means for providing a first current;
B. means for providing a second current;
C. a first pair of switches;
D. a second pair of switches;
E. first means for enabling said first pair of switches to pass said first current through one of said loads in a first direction;
F. second means for enabling said second pair of switches to pass said second current through said one of said loads in a second direction;
G. third means for enabling said first pair of switches to pass said second current through another one of said loads in said second direction; and
H. fourth means for enabling said second pair of switches to pass said first current through said another one of said loads in said first direction.

* * * * *

UNITED STATES PATENT OFFICE

CERTIFICATE OF CORRECTION

PATENT NO. : 3,849,768

DATED : November 19, 1974

INVENTOR(S) : Srirama S. Durvasula

It is certified that error appears in the above-identified patent and that said Letters Patent are hereby corrected as shown below:

Column 6, lines 21 and 22, delete, "in said second path therethrough, and said transistors".

Signed and Sealed this

Tenth Day of August 1976

[SEAL]

*Attest:*

RUTH C. MASON
*Attesting Officer*

C. MARSHALL DANN
*Commissioner of Patents and Trademarks*